United States Patent [19]

Pioch

[11] 4,297,831
[45] Nov. 3, 1981

[54] CUTTING BLADE FOR A ROTARY LAWNMOWER

[75] Inventor: Peter P. Pioch, Idstein, Fed. Rep. of Germany

[73] Assignee: Black & Decker Inc., Newark, Del.

[21] Appl. No.: 119,584

[22] Filed: Feb. 7, 1980

[30] Foreign Application Priority Data

Jan. 29, 1980 [EP] European Pat. Off. ........... 80100452

[51] Int. Cl.³ .............................................. A01D 55/18
[52] U.S. Cl. ...................................................... 56/295
[58] Field of Search ................................. 56/295, 13.4

[56] References Cited

U.S. PATENT DOCUMENTS

| | | | |
|---|---|---|---|
| 2,764,865 | 10/1956 | Pollard | 56/295 |
| 3,162,990 | 12/1964 | Cook | 56/295 |
| 3,183,655 | 5/1965 | Dunlap et al. | 56/295 |
| 3,538,692 | 11/1970 | Cope et al. | 56/295 |
| 3,636,685 | 1/1972 | Speckman | 56/295 |
| 3,888,072 | 6/1975 | Templeton | 56/295 |
| 3,998,037 | 12/1976 | Deans et al. | 56/295 |
| 4,015,408 | 4/1977 | Cornellier | 56/295 |
| 4,079,578 | 3/1978 | Cornellier | 56/295 |

FOREIGN PATENT DOCUMENTS

| | | | |
|---|---|---|---|
| 993200 | 7/1976 | Canada | 56/295 |
| 1963836 | 1/1971 | Fed. Rep. of Germany | 56/295 |

Primary Examiner—Jay N. Eskovitz
Attorney, Agent, or Firm—Walter Ottesen; Leonard Bloom; Edward D. Murphy

[57] ABSTRACT

A cutting blade for a rotary mower has a generally horizontally disposed, elongated blade body adapted for rotational movement about the vertical axis thereof when operatively connected to a rotary mower, and a plurality of fins attached to the blade body, each fin extending generally vertically from the blade body and away from the vertical axis thereof and disposed at an angle to the longitudinal axis of the blade body such that the outwardly facing surface of each fin is presented to the air upon rotation of the blade. In operation, the fins force air and grass clippings upwardly and radially outwardly from the rotating cutting blade.

14 Claims, 16 Drawing Figures

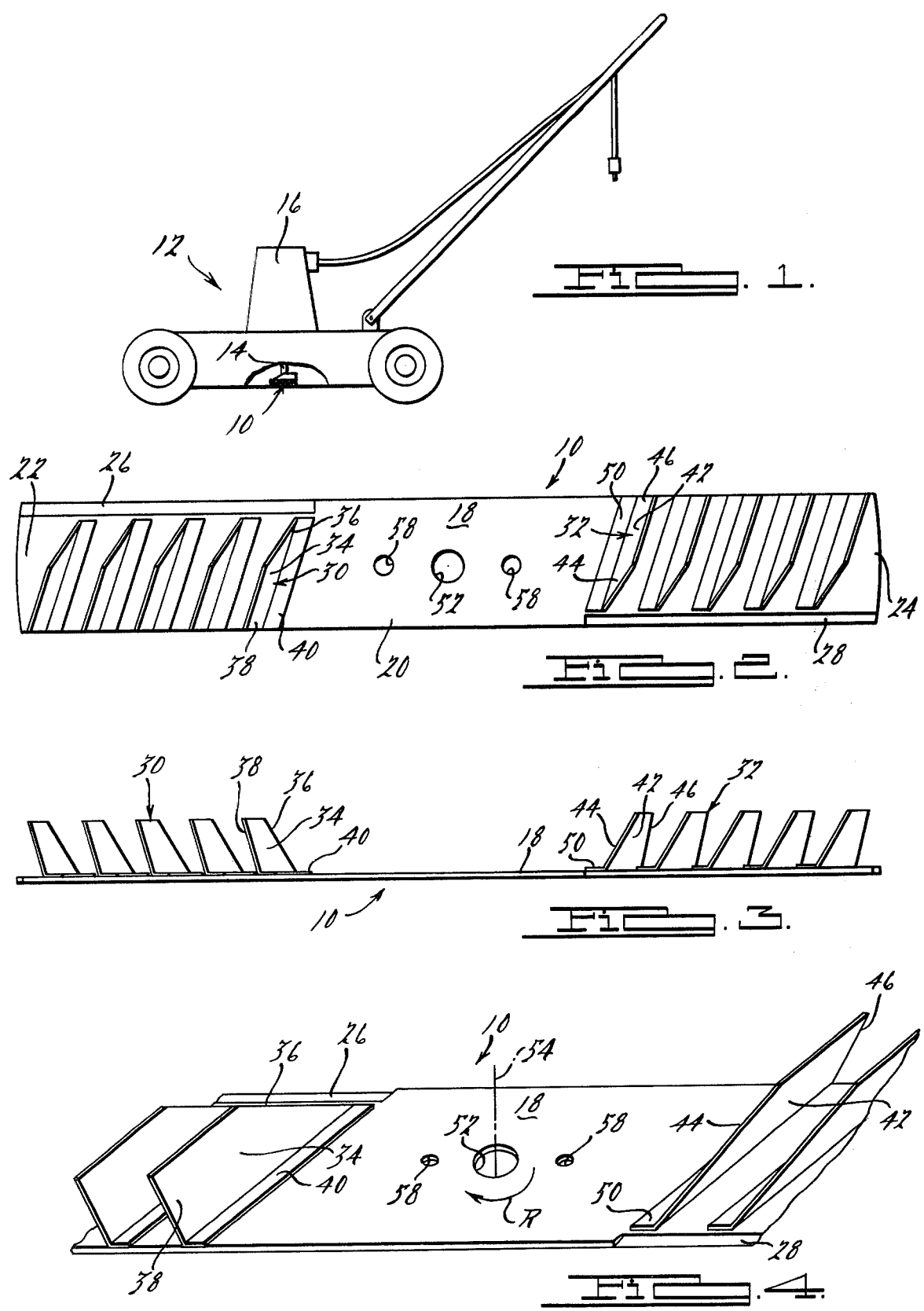

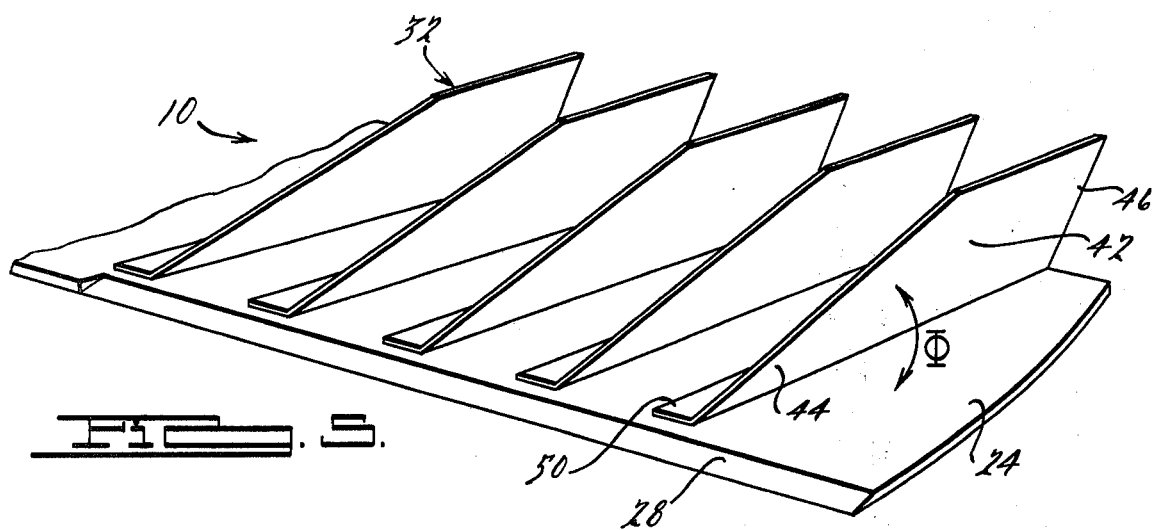
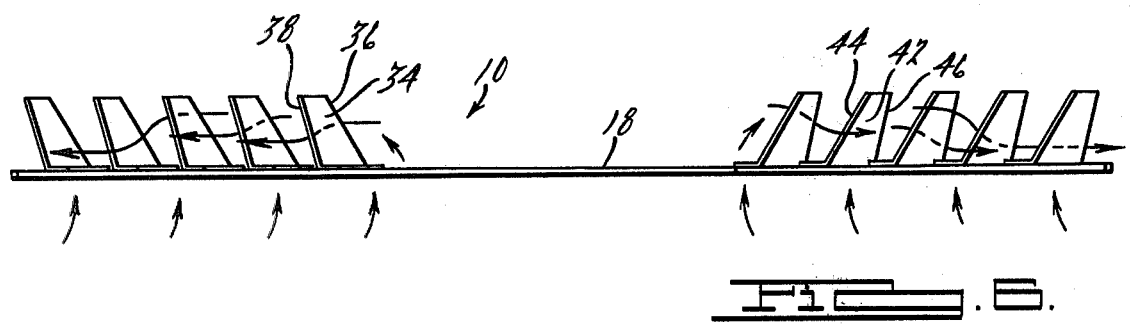
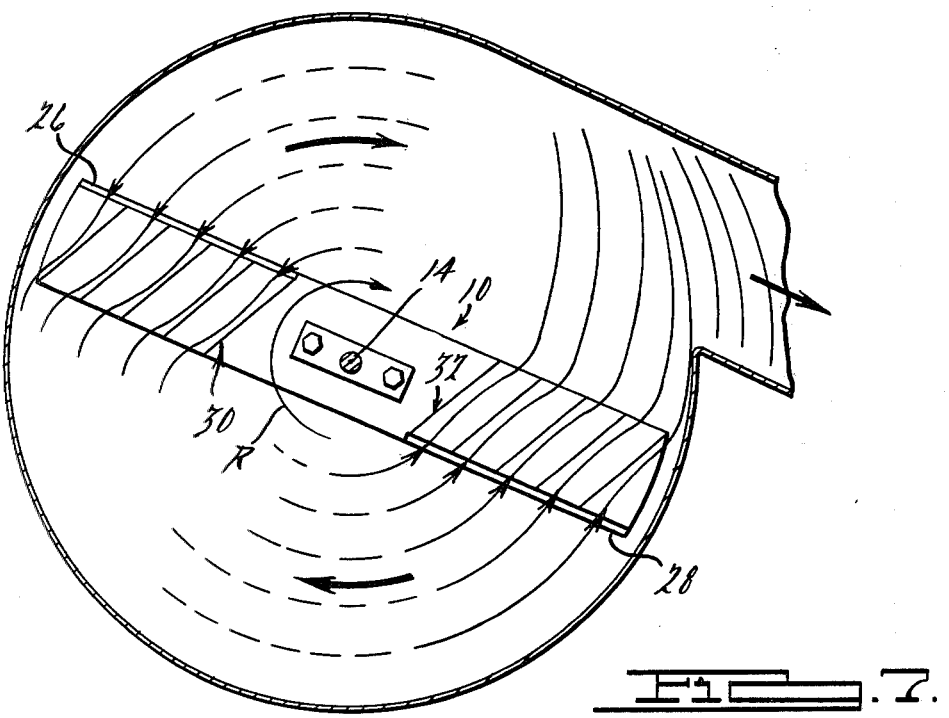

CUTTING BLADE FOR A ROTARY LAWNMOWER

BACKGROUND OF THE INVENTION

The present invention relates to a cutting blade for use in a rotary lawnmower. More particularly, the present invention relates to a low noise, rotary cutting blade which functions as a backward curved centrifical fan to provide a good upward and outward flow of air.

In order for a rotary lawnmower to provide a good, even cut of grass, the cutting blade must generate a substantial flow of air upwardly into the blade housing. This upward flow of air stands the grass up to be in position to be cut by the blade. Otherwise, an even cut will not be achieved. Also, the blade must generate a substantial flow of air from the interior of the housing outwardly into, for example, a grass collecting bag. This flow of air is necessary to transport the grass clippings outwardly from the interior of the housing so that the clippings do not accumulate therein and interfere with the rotation of the cutting blade.

Unfortunately, with conventional blades, high speeds of blade rotation must be used to obtain the aforementioned air flows. At such high speeds of rotation a certain amount of irritating and bothersome noise is generated. Hence, it would be desirable to have a cutting blade which develops a substantial flow of air even at a relatively slow speed of rotation. Further, it would be desirable to have a cutting blade which is quiet in operation.

SUMMARY OF THE INVENTION

In accordance with the present invention a cutting blade for a rotary lawnmower has a generally horizontally disposed elongated blade body adapted for rotational movement about the vertical axis thereof when operatively connected to a rotary mower, and at least one fin attached to opposite end portions of the blade body, each fin extending generally vertically from the blade body and away from the vertical axis thereof and each fin presenting an outwardly facing surface in a forward direction upon rotation of the cutting blade. Each fin can have a planar, convex-curved or concave-curved shape. In one preferred embodiment of the present invention, the fins are positioned on the underside of a propellor-like blade body. Damage to the fins from rocks and the like is avoided by extending each fin no further downward than the horizontal plane of the forwardly facing cutting edge of the associated end portion of the blade body.

BRIEF DESCRIPTION OF THE DRAWINGS

FIG. 1 is a perspective view, broken away, showing a cutting blade in accordance with the present invention in operative association with a rotary lawnmower;

FIG. 2 is a plan view of the cutting blade of FIG. 1;

FIG. 3 is an elevational view of the cutting blade of FIGS. 1 and 2;

FIG. 4 is a perspective view, broken away, of the cutting blade of FIGS. 1–3;

FIG. 5 is a perspective view, broken away, of an end portion of a cutting blade of FIG. 1 showing one set of fins thereon;

FIG. 6 is an elevational view of the cutting blade of FIGS. 1–5 illustrating the direction of air flow developed thereby when in use;

FIG. 7 is a plan view of the cutter blade of FIGS. 1–6 further illustrating the air flow developed thereby when in use;

DESCRIPTION OF THE INVENTION

Figure 8:
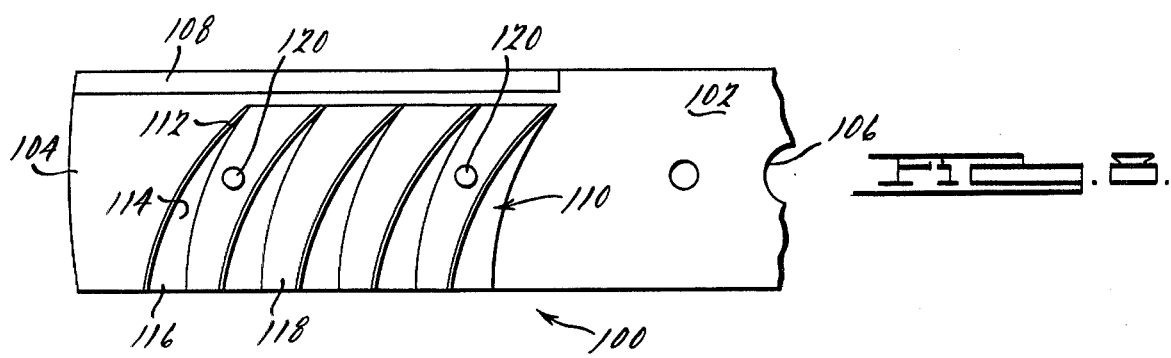
FIG. 8 is a plan view, broken away, of an alternative embodiment of the cutting blade of the present invention having convex-curved fins.

Now referring to the drawing, a cutting blade made in accordance with the present invention is shown in FIGS. 1–7 and indicated generally by the numeral 10. FIG. 1 shows cutting blade 10 installed on a conventional lawnmower 12. Thus, cutting blade 10 is mounted on vertical drive shaft 14 which is rotatably driven by electric motor 16. As will be further appreciated from the following description of the present invention, cutting blade 10 provides a good upward and outward air flow for cutting and transporting grass into a grass collecting container. Cutting blade 10 also operates at a low noise level. As shown in FIGS. 2–5, the structure of cutting blade 10 includes a horizontally disposed, elongated blade body 18 which has a generally flat, rectangular shape and comprises a central portion 20 and opposite end portions 22 and 24. End portion 22 has a cutting edge 26 integrally formed thereon and end portion 24 has a cutting edge 28 integrally formed thereon. It will, of course, be appreciated that, in use, cutting blade 10 rotates in a direction which presents each cutting edge 26 and 28 to the upstanding grass blades so as to effect the cutting of the grass blades during the lawnmowing operation.

It will be noted that blade member 18 has no upwardly turned edge trailing portion such as is often employed in cutting blades for rotary lawnmowers to obtain the desired updraft. This desired airflow is achieved in accordance with the present invention by the provision of fins 30 and 32 which are mounted on end portions 22 and 24, respectively, of blade body 18. Referring to fins 30, each fin 30 has a generally vertically upwardly extending planar wall 34 comprising a forward portion 36 and a rearward portion 38. As used herein, the terms "forward" and "rearward" are intended to be with respect to the direction of movement when the cutting blade of the present invention is in use. Each fin 30 has a base flange 40 integrally formed with wall 34 and which provides means for fixedly securing fin 30 to the upper surface of blade body 18 as by welding or the like. The forward edge of wall 34 is preferably rearwardly sloping as in the nature of a swept back wing. Each fin 30 is canted from the vertical so as to extend radially outwardly. As used herein, the term "radially" is with reference to the rotating cutting blade. By extending each fin 30 radially outwardly as well as upwardly from end portion 22, the entrapment of grass clippings by fins 30 is minimized.

Each fin 30 is positioned on end portion 22 of blade body 18 so that forward portion 36 of wall 34 is closer to the axis of rotation 54 of cutting blade 10 than is the rearward portion 38 of wall 34. It will, of course, be appreciated that axis of rotation 54 coincides with the vertical axis of cutting blade 10 and extends through the center of hole 52 by which in combination with fastening means (not shown in the figures) through holes 52 and 58, cutting blade 10 is attached to drive shaft 14 in a conventional manner. Thus, each fin 30 is positioned so as to present the radially outside surface of wall 34 to the air upon rotation of cutting blade 10 and, hence, the forwardly and radially outwardly facing surface forces air radially outwardly from cutting blade 10 so that cutting blade 10 functions as a backward curved centrifugal fan.

In a symmetrical and analogous manner, fins 32 are attached to end portion 24 of blade body 18. Thus, each fin 32 comprises a generally vertically upwardly extending wall 42 integrally formed with flange 50 which is attached to the upper surface of end portion 24. Wall 42 has a forward portion 44 and a rearward portion 46 and is canted radially outwardly from the vertical. Thus, as shown in FIG. 5 with respect to fins 32, each fin 32 is disposed at an angle such that the angle $\Phi$ between wall 42 and the portion of blade body 18 extending radially outwardly therefrom is an acute angle. Of course, it is contemplated that fins 30 will be symmetrically positioned at the same angle $\Phi$ as fins 32. The canting of walls 34 and 42 from the vertical, substantially reduces the liklihood of grass clippings being captured or entrapped by fins 30 or 32.

The air flow obtained by cutting blade 10 is illustrated in FIGS. 6 and 7. Rotation of cutting blade 10 in direction R, forces air outwardly as indicated by the plurality of generally horizontal arrows in FIG. 6. The outward movement of air draws the desired updraft, indicated by the upwardly extending arrows in FIG. 6. The air movement is further illustrated in FIG. 7 where the lighter arrows indicate air flow relative to cutting blade 10 and the heavier arrows indicate air flow relative to the blade housing of the lawnmower. Upon rotational movement of blade 10 about drive shaft 14 in the direction indicated by arrow R, air is forced centrifically outwardly by fins 30 and 32 as indicated by the lighter arrows. The forward movement of each of fins 30 and 32 also, of course, moves air in a forward direction although at a velocity less than that of the fin itself. The resulting air flow is shown by the heavier arrows to be a generally circular movement exhausting through the exhaust chute of the lawnmower housing.

Figure 9:
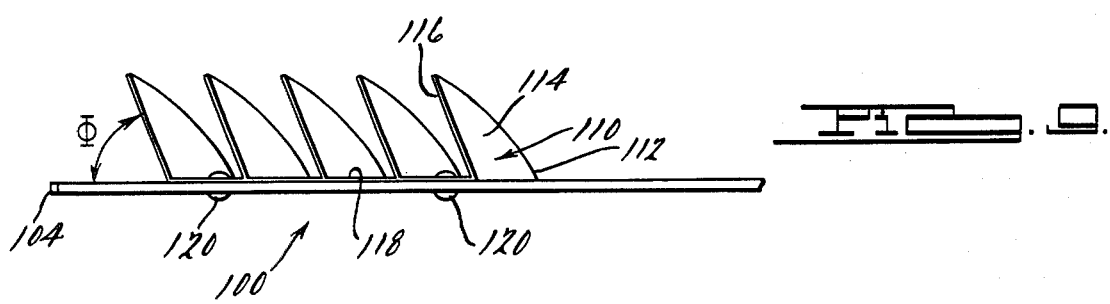
FIG. 9 is an elevational, broken away, view of the cutting blade of FIG. 8.
Figure 10:
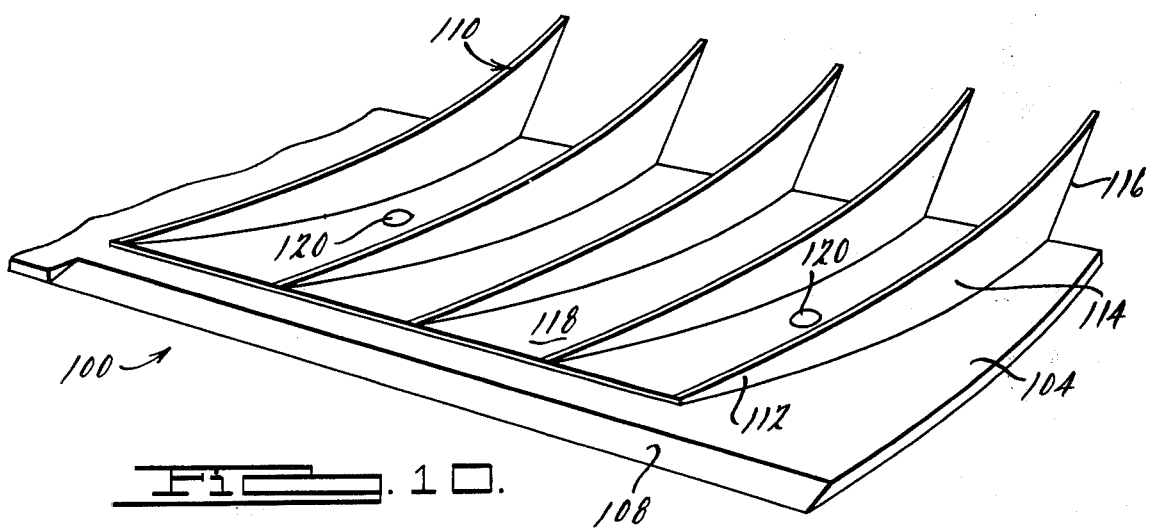
FIG. 10 is a perspective view, broken away, of the cutting blade of FIG. 8.

Now referring to FIGS. 8–10, an alternative embodiment of a cutting blade of the present invention is shown and indicated generally by the numeral 100. Cutting blade 100 has a flat elongated blade body 102 analogous to blade body cutting blade 10 previously disclosed. Thus, blade body 102 has opposite end portion 104 having cutting edge 108 on the forward edge thereof. Blade body 102 has a centrally disposed aperture 106 adapted to receive a drive shaft of a lawnmower for mounting of cutting blade 100. It will, of course, be appreciated that the following description of end portion 104 and fins 110 thereon is fully applicable to the opposite symmetrical end portion and fins not shown in the Figures.

Mounted on the upper surface of end portion 102 of blade member 102 are a plurality of curved fins 110 which have a curved wall 114 with a forward portion 112 and a rearward portion 116. As is shown in FIGS. 8–10, each fin 110 is curved in a convex manner as viewed from the axis of rotation or from the center of aperture 106. Each fin 110 extends upwardly from an integral fin base plate 118 which is secured to the upper surface of end portion 104 of blade member 102 by a plurality of rivets 120. As in the previous embodiment, each wall 114 of each fin 110 is canted radially outwardly from the vertical so as to form an acute angle $\Phi$ with respect to the portion of blade body 102 extending radially outwardly therefrom. Also, each wall 114 is positioned so as to present a forwardly radially outwardly facing wall surface so that cutting blade 100 is adapted to perform as a backward curved centrifugal fan in a manner similar to that of cutting blade 10.

Figure 11:
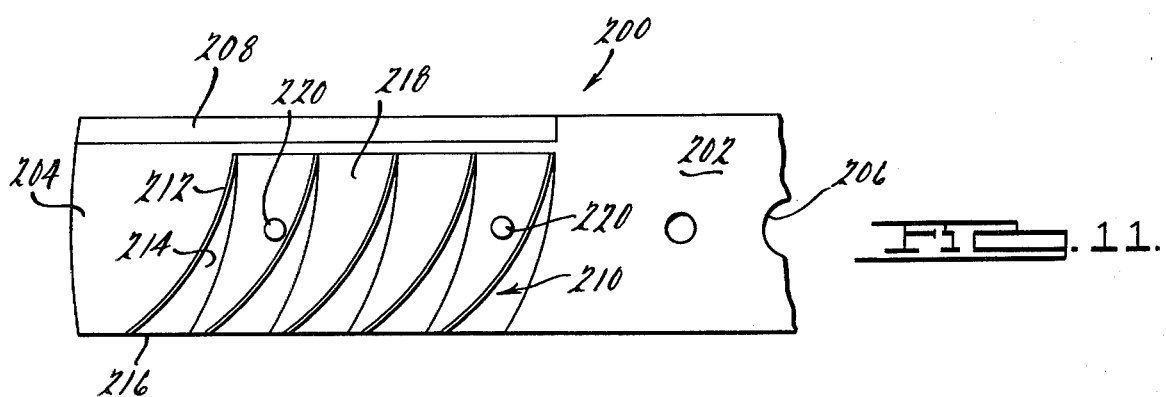
FIG. 11 is a plan view, broken away, of an end portion of another alternative embodiment of the cutting blade of the present invention having concave-curved fins.
Figure 12:
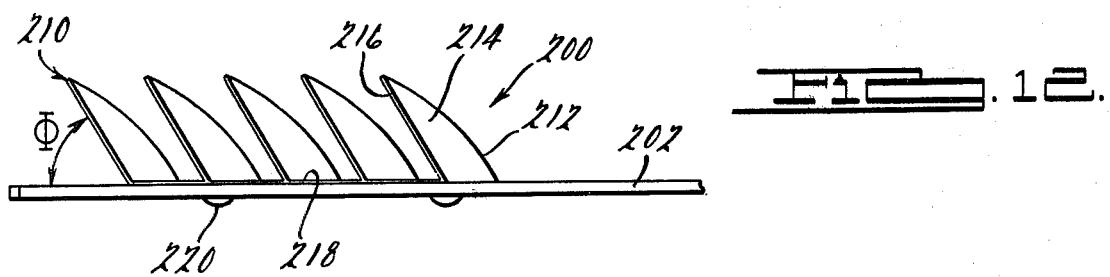
FIG. 12 is an elevational view broken away of the cutting blade of FIG. 11.
Figure 13:
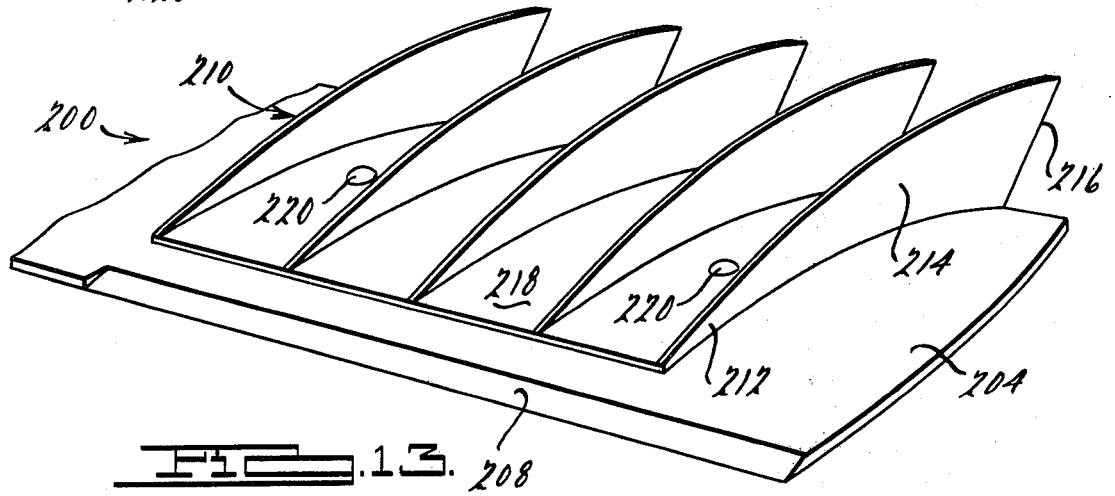
FIG. 13 is a perspective view, broken away, of the cutting blade of FIGS. 11 and 12 showing the fins thereof.

Now referring to FIGS. 11–13, another alternative embodiment of the present invention is disclosed and indicated generally by the numeral 200. Cutting blade 200 has a flat, elongated blade body 202 analogous to previously disclosed blade bodies 18 and 102. Blade body 202 has opposite end portions, one of which is shown in FIGS. 11–13 and indicated as end portion 204 with cutting edge 208, and has a centrally disposed aperture 206 adapted to receive the drive shaft of an associated lawnmower and about which it is contemplated that blade body 202 and hence, cutting blade 200 will rotate. The following description of opposite end portion 204 and fins 210 thereon is, of course, fully applicable to the symmetrical opposite end portion not shown in the figures.

Cutting blade 200 has a plurality of fins 210 extending upwardly and radially outwardly from the upper surface of end portion 204 of blade member 202. Each fin 210 has a curved wall 214 which comprises a forward portion 212 and a rearward portion 216. Each wall 214 is curved in a concave manner as viewed from the axis of rotation or from the center of aperture 206. Each fin 210 is formed integrally with and extends upwardly from a base plate 218 which is fixedly attached to blade member 202 by a plurality of rivets 220.

Each wall 214 of each fin 210 is disposed at an acute angle $\Phi$ with respect to the portion of blade body 202 extending radially outwardly therefrom. Also, forward portion 212 of each wall 214 is positioned closer to the axis of rotation than is the rearward portion 216 so that each fin 210 presents a forwardly, radially outwardly facing wall surface. Thus, cutting blade 200 is well adapted to function in a manner analogous to that of the previous embodiments.

Figure 14:
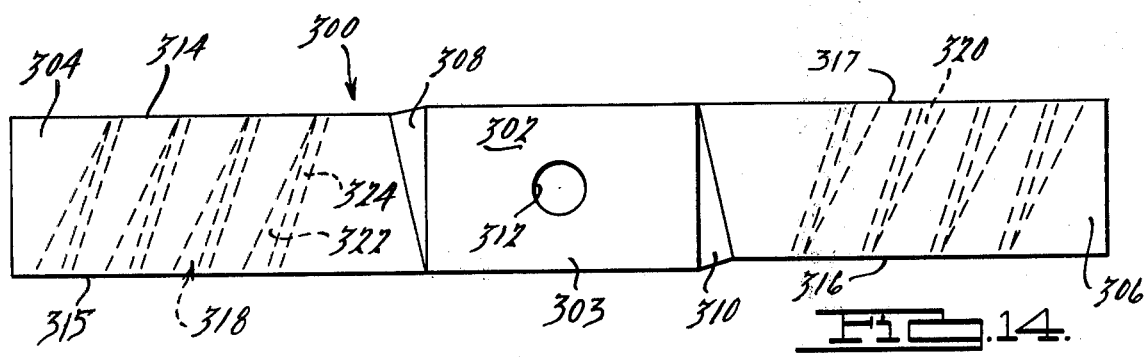
FIG. 14 is a plan view of another alternative cutting blade of the present invention.
Figure 15:
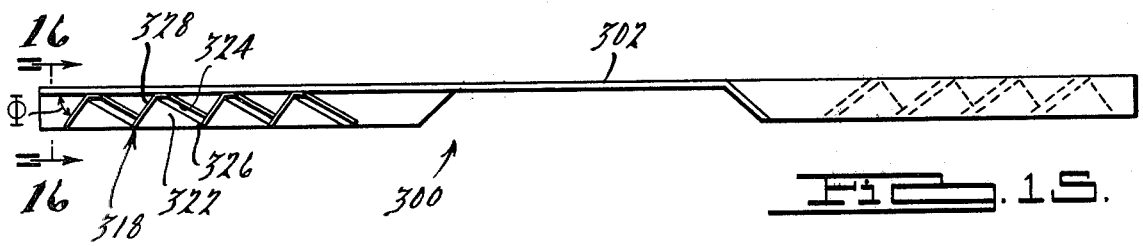
FIG. 15 is a front elevational view of the cutting blade of FIG. 14.
Figure 16:
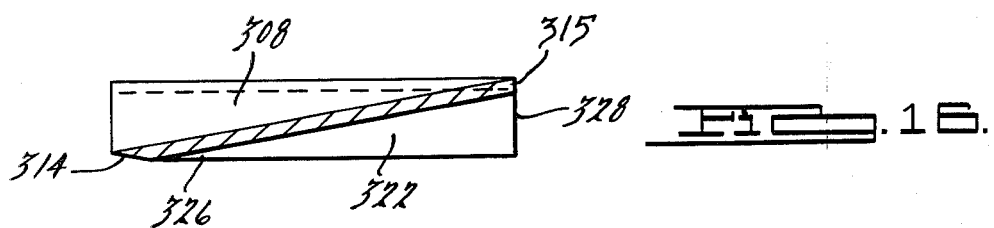
FIG. 16 is a sectional view taken along line 16—16 of FIG. 15.

Now referring to FIGS. 14–16 yet another alternative embodiment of the present invention is illustrated and indicated generally by the numeral 300. Cutting blade 300 comprises an elongated blade body 302 which has flat opposite end portions 304 and 306 each of which are inclined from the plane of central portion 303 of blade body 302 in the manner of a propeller. Thus, cutting blade 300 has a centrally disposed flat portion 303 with central aperture 312 therein adapted to fit over the drive shaft of a lawnmower 308 and 310, and flat end portions 304 and 306. Flat end portion 304 has cutting edge 314 on the forward edge thereof and is canted from the horizontal such that forward, cutting edge 314 is disposed on a lower plane than the rearward edge 315. Similarly, flat end portion 306 has cutting edge 316 on the forward edge thereof and is canted from the horizontal such that forward cutting edge 316 is disposed on a lower plane than rearward edge 317.

Each end portion 304 and 306 has respectively positioned thereon a plurality of generally vertically extending fins 318 and 320. In the embodiment of FIGS. 14–16, however, fins 318 and 320 extend vertically generally downwardly rather than upwardly. As in the previous embodiments, each fin 318 and 320 is canted radially outwardly from the vertical to obtain the benefits hereinbefore mentioned. Thus, each fin 318 and 320 is positioned at an acute angle $\Phi$ with respect to the portion of end portion 304 or 306 extending radially outwardly therefrom.

Each fin 318 has a generally triangularly shaped wall 322 which is integrally formed with flange 324 which is fixedly attached to the underside of end portion 304. Each wall 322 has a forward portion 326 and a rearward portion 328 and is positioned with a forwardly, radially outwardly facing wall. Forward portion 326 is positioned closer to the vertical axis, i.e. the axis of rotation of blade 300, than is rearward portion 328. Thus, upon rotation of blade 300, air will be forced radially outwardly and the beneficial effects of the present invention will be obtained.

It will, of course, be appreciated that each fin 320 is constructed and disposed on end portion 306 in a manner symmetrical with, and analogous to, fins 318 on end portion 304. Although fins 318 and 320 are disposed on the underside of end portions 304 and 306, each fin 318 and 320 is located above the horizontal plane in which cutting edges 314 and 316 are positioned. Thus, each fin is positioned between the planes of the forward and trailing edges of the associated end portion and is protected from contact from rocks and the like during use of blade 300.

It will, of course, be appreciated that the present invention is subject to modification and variation. For example, the exact number and size of the fins as well as the exact angle $\Phi$ can be varied depending upon the specific use and effects desired. While specific embodiments of the present invention have been described and illustrated herein, it is to be understood that the invention may be varied within the scope of the appended claims without departing from the spirit of the invention.

What is claimed is:

1. A cutting blade for a rotary mower having a horizontally disposed blade body having cutting edges thereon and adapted for rotational movement about the vertical axis thereof when operatively connected to a rotary mower, comprising:

a plurality of generally vertically extending fins mounted on said blade body, each of said fins being spaced from said vertical axis and having a forward portion which extends from said blade body at a position closer to said vertical axis than the position at which a rearward portion thereof extends from said blade body, and each of said fins being inclined outwardly away from said vertical axis to make an acute angle with respect to the portion of said horizontally disposed blade body extending radially outwardly therefrom.

2. A cutting blade for a rotary mower having a horizontally disposed blade body having cutting edges thereon and adapted for rotational movement about the vertical axis thereof when operatively connected to a rotary mower, comprising:

a plurality of fins attached to said blade body, each of said fins extending generally vertically and radially outwardly from the said blade body and each of said fins having a forwardly and radially outwardly facing side wall; and, wherein said blade body has opposite end portions and a plurality of said fins are mounted on each of said end portions.

3. A cutting blade for a rotary mower having a horizontally disposed blade body having cutting edges thereon and adapted for rotational movement about the vertical axis thereof when operatively connected to a rotary mower, comprising:

a plurality of generally vertically and radially outwardly extending fins mounted on said blade body, each of said fins being spaced from said vertical axis and comprising a concavely curved wall, one side of said curved wall facing forwardly and radially outwardly; and, wherein said blade body has opposite end portions and a plurality of said fins are mounted on each of said end portions.

4. A cutting blade for a rotary mower having a horizontally disposed blade body having cutting edges thereon and adapted for rotational movement about the vertical axis thereof when operatively connected to a rotary mower, comprising:

a plurality of generally vertically and radially outwardly extending fins mounted on said blade body, each of said fins being spaced from said vertical axis and comprising a convexially curved wall, one side of said curved wall facing forwardly and radially outwardly; and, wherein said blade body has opposite end portions and a plurality of said fins are mounted on each of said end portions.

5. A cutting blade for a rotary mower having a horizontally disposed blade body having cutting edges thereon and adapted for rotational movement about the vertical axis thereof when operatively connected to a rotary mower, comprising:

said blade body having opposite planar end portions which are canted from the horizontal so that the forward edge of each said opposite end portion is in a lower horizontal plane than is the rearward edge thereof;

a plurality of generally vertically extending fins mounted on each of said opposing end portions of said blade body, each of said fins having a forwardly and radially outwardly facing side wall and being disposed at an acute angle with respect to the end portion of said blade body extending radially outwardly therefrom, and each of said fins being disposed between the horizontal planes of said forward and rearward edges.

6. A cutting blade as recited in claims 1, 2 or 3 wherein each of said fins comprises a generally vertically extending wall and an integral horizontal flange, said flange being attached to said blade body.

7. A cutting blade as recited in claims 1 or 2 wherein each of said fins comprises a planar generally vertically and radially outwardly extending wall.

8. A cutting blade as recited in claims 1 or 2 wherein each of said fins comprises a curved, generally vertically and radially outwardly extending wall.

9. A cutting blade as recited in claims 1, 2, 3, or 4 wherein each of said fins comprises a generally vertically radially outwardly extending wall and more than one said wall extends upwardly from a horizontal base plate which is fixedly attached to said blade body.

10. A cutting blade as recited in claim 1, wherein said blade body has opposite end portions and a plurality of fins are mounted on each of said end portions.

11. A cutting blade as recited in claims 1, 2, 3, 4, or 5 wherein the forward edge of each of said fins is rearwardly sloping.

12. A cutting blade as recited in claims 1, 2, 3, or 4 wherein said fins extend upwardly from said blade body.

13. A cutting blade for a rotary lawnmower, comprising:

a horizontally disposed elongated blade body adapted for rotation about a central vertical axis thereof when operatively connected to a rotary lawnmower, said blade body having two opposed end portions each having a leading cutting edge;

at least one fin extending generally vertically from each end portion at a location intermediate the length of that end portion; and each fin having a forward portion thereof secured to said blade body at a position closer to said vertical axis than the position at which a rearward portion thereof is secured to said blade body, each fin being inclined outwardly from said vertical axis to make an acute angle with respect to the portion of said horizontally disposed blade body extending radially outwardly therefrom, each fin extending generally transversely of said blade body and having a leading edge which extends upwardly and rearwardly from a position adjacent the leading cutting edge of the end portion from which it extends, and each fin extending substantially across the full width of the end portion from which it extends;

whereby, upon rotation of the cutting blade at a relatively slow speed of rotation said fins develop substantial outward flow of air at a low noise level.

14. The cutting blade as recited in claim 13, wherein a plurality of said fins are mounted on each of said end portions.

* * * * *